US010562176B2

(12) United States Patent
Illingworth

(10) Patent No.: US 10,562,176 B2
(45) Date of Patent: Feb. 18, 2020

(54) ALIGNMENT TOOL

(71) Applicant: Martin Illingworth, London (GB)

(72) Inventor: Martin Illingworth, London (GB)

(*) Notice: Subject to any disclaimer, the term of this patent is extended or adjusted under 35 U.S.C. 154(b) by 121 days.

(21) Appl. No.: 15/542,053

(22) PCT Filed: Jan. 5, 2016

(86) PCT No.: PCT/GB2016/000001
§ 371 (c)(1),
(2) Date: Jul. 6, 2017

(87) PCT Pub. No.: WO2016/110675
PCT Pub. Date: Jul. 14, 2016

(65) Prior Publication Data
US 2018/0021939 A1 Jan. 25, 2018

(30) Foreign Application Priority Data
Jan. 6, 2015 (GB) .................................. 1500108.4

(51) Int. Cl.
*G01C 9/24* (2006.01)
*B25H 7/02* (2006.01)
(52) U.S. Cl.
CPC ...... *B25H 7/02* (2013.01); *G01C 9/24* (2013.01)
(58) Field of Classification Search
CPC .................................. B25H 7/02; G01C 9/24
USPC .......................................... 33/354, 421, 471
See application file for complete search history.

(56) References Cited

U.S. PATENT DOCUMENTS

| 380,360 | A | * | 4/1888 | Spencer et al. | ........... | B43L 7/12 |
| | | | | | | 33/43 |
| 1,015,773 | A | * | 1/1912 | Auger | ...................... | G01B 3/06 |
| | | | | | | 33/340 |
| 2,373,322 | A | * | 4/1945 | MacRae | .................. | A47F 13/00 |
| | | | | | | 33/456 |
| 2,422,745 | A | * | 6/1947 | Ost | .......................... | G01B 3/04 |
| | | | | | | 235/70 C |
| 2,770,043 | A | * | 11/1956 | Kwiecinski | ......... | E04F 21/1838 |
| | | | | | | 33/452 |
| 3,693,261 | A | * | 9/1972 | Moore | ...................... | B43L 7/12 |
| | | | | | | 33/1 AP |

(Continued)

FOREIGN PATENT DOCUMENTS

CH      650076 A5    6/1985
DE     10154574 A1    5/2003
(Continued)

*Primary Examiner* — Yaritza Guadalupe-McCall
(74) *Attorney, Agent, or Firm* — AEON Law, PLLC; Adam L.K. Philipp; David V.H. Cohen

(57) ABSTRACT

An alignment tool 1 for use in marking a surface is disclosed. The tool comprises a handle 6, two pairs of longitudinal arms 2,4 and 3,5 each rotatably mounted in the region of their longitudinal centres to a rotational mechanism provided in or on the handle. The rotational mechanism is arranged such that, in use, movement of one of the pairs in a first rotational direction results in movement of the other pair in the counter direction by substantially the same angle. Each of the arms carries at least one movable marking indicator 50, 53. A user-operable locking mechanism is on or associated with the handle, the locking mechanism being configured selectively to prevent and enable rotation of the arms.

15 Claims, 8 Drawing Sheets

(56) References Cited

U.S. PATENT DOCUMENTS

| | | | | |
|---|---|---|---|---|
| 4,914,825 A * | 4/1990 | Howard | ............... | G01B 3/566 33/427 |
| 5,046,387 A * | 9/1991 | Levake | ............... | B25F 1/00 15/235.4 |
| 5,915,806 A | 6/1999 | Levee | | |
| 6,141,882 A | 11/2000 | Syken | | |
| 6,247,240 B1 * | 6/2001 | Economaki | ............... | G01B 3/006 33/27.03 |
| 6,467,179 B1 * | 10/2002 | Wolf | ............... | B43L 7/027 33/465 |
| 6,568,021 B1 * | 5/2003 | Wood | ............... | B25F 1/00 15/235.4 |
| 6,668,417 B1 * | 12/2003 | Slattery | ............... | B25H 1/0085 15/235.4 |
| 7,082,692 B2 * | 8/2006 | Shapiro | ............... | B43L 7/10 33/464 |
| 8,171,651 B2 * | 5/2012 | Williams | ............... | G01B 3/56 33/418 |
| 8,911,384 B2 * | 12/2014 | Santiago | ............... | A61B 5/1109 33/512 |
| 2004/0177527 A1 * | 9/2004 | Prevost | ............... | A47G 1/205 33/613 |
| 2004/0244212 A1 | 12/2004 | Melittas | | |
| 2006/0090360 A1 | 5/2006 | Shapiro | | |
| 2009/0193670 A1 | 8/2009 | Fernandes | | |
| 2014/0173923 A1 * | 6/2014 | Van Bortel | ............... | A47G 1/06 33/379 |
| 2018/0021939 A1 * | 1/2018 | Illingworth | ............... | B25H 7/02 33/354 |

FOREIGN PATENT DOCUMENTS

| | | |
|---|---|---|
| DE | 202005001517 U1 | 7/2005 |
| FR | 2660230 A1 | 10/1991 |
| GB | 2470239 A | 11/2010 |

* cited by examiner

ALIGNMENT TOOL

FIELD OF THE INVENTION

This invention relates to an alignment tool suitable for use in marking the position of holes to be made in a surface, such as a wall.

BACKGROUND OF THE INVENTION

When fixing an object to a wall using screws or nails, markings or pilot holes are usually made in advance of drilling and/or inserting the screws or nails.

In order to mark at least two horizontally-level points, it is usually necessary to employ a spirit level to establish a horizontal line, and then a ruler to set the markings at the required distance either side of a centre point.

This is a cumbersome task, requiring multiple tools, and often results in errors. Further, if more than two markings or holes are required, e.g. four points, equidistant apart in the upper and lower horizontal, the task becomes even more difficult.

One way in which relatively accurate marking can be achieved is by providing a paper template which sets-out the exact marking points for a particular fixture, which template is then laid-up to the wall so that marks can be made through the paper. The template is however non-adjustable, in that it caters for a specific fixture, and can only be used for that purpose once or a limited number of times.

SUMMARY OF THE INVENTION

A first aspect of the invention provides an alignment device for use in marking a surface, the device comprising:
  first and second longitudinal arms, each rotatably connected to a hub or handle, each arm carrying a scale or an indicator element; and
  a user-operable locking mechanism configured selectively to prevent and enable rotation of the arms.

The arms may be rotatably connected to a handle and the locking mechanism may be on or associated with the handle.

Each arm may carry an indicator element or elements movable relative to the arm along at least part of its length.

The first and second arms may be connected to a mechanism configured such that rotational movement of one arm in a first direction is effective to move the other arm by the same amount in the counter direction.

The mechanism may be a linkage mechanism comprised of a pair of linkage arms each connected at one part to a respective one of the longitudinal arms and at another part connected to each other.

The locking mechanism may comprise a screw/clutch plate arrangement selectively movable between a locked position in which it applies a force onto the arms to hinder rotation and an unlocked position to release said force to permit rotation.

The locking mechanism may comprise a lever provided on the handle selectively movable between a locked position and an unlocked position, the lever in the locked position being arranged to apply a force onto the arms to hinder their rotation and in the unlocked position to release said force to permit rotation.

The handle may comprise a rear part to which the arms are connected and a front part shaped and dimensioned to provide a hand grip, the lever of the locking mechanism being provided on said hand grip part. The lever may be located within a recess provided on the hand grip part and mounted so as to be substantially flush with the exterior of the hand grip part when locked. The lever may be a trigger-type lever provided on or in the front part of the hand grip.

The device may further comprise at least one spirit level. The or each spirit level may be on or associated with the handle. The device may comprise first and second spirit levels, one oriented vertical and the other horizontal.

Each arm may be formed of first and second portions, the first arm portion being connected to the handle and the second arm portion being telescopically mounted with the first arm portion to enable the arm's length to be extended.

The first arm portion may comprise a slotted sleeve within which the second arm portion is telescopically located.

The device may further comprise an extension locking mechanism provided on the second arm portion selectively to prevent and allow telescopic movement between the portions.

The indicator element may be provided by an aperture formed at or near the free-end of the second arm portion.

First and second indicator elements may be provided, one on each of the arm portions.

The indicator element on the first arm portion may be a slider, part of which is located within a further slot on said arm portion. The slider may comprise a slider lock configured to selectively lock the position of the slider relative to the arm.

The device may comprise two pairs of arms, the arms of each pair being connected and diametrically opposed either side of the handle.

A second aspect provides an alignment device for use in marking a surface, the device comprising:
  a pair of longitudinal arms, each rotatably mounted in the region of their longitudinal centres to a rotational mechanism provided in or on a hub or handle, the rotational mechanism being arranged such that, in use, movement of one of the pairs in a first rotational direction results in movement of the other pair in the counter direction by substantially the same angle, each of the arms carrying a scale or at least one movable marking indicator.

Each pair of arms may carry a scale or movable marking indicator either side of the hub or handle.

The device may further comprise a user-operable locking mechanism, the locking mechanism being configured selectively to prevent and enable rotation of the arms.

A further aspect provides an alignment device for use in marking a surface, the device comprising: a plurality of arms movably connected to a hub, movement of one of the arms causing in use movement of the other arm(s) in a predetermined motion, each of the arms carrying a scale or marking indicator. Four arms may be provided. The four arms may comprise two pairs of arms, with each pair being formed of two integrally formed or joined arms.

BRIEF DESCRIPTION OF THE DRAWINGS

The invention will now be described, by way of non-limiting example, with reference to the accompanying drawings, in which.

DETAILED DESCRIPTION OF A PREFERRED EMBODIMENT

The embodiment described herein is an alignment tool 1 for use in marking fixture positions on a surface, such as a wall. In particular, the tool 1 allows pairs of holes to be marked accurately with a particular user-settable spacing between the holes along a level horizontal and/or vertical axis. Up to four markings can be made in the embodiment described.

Figure 1:
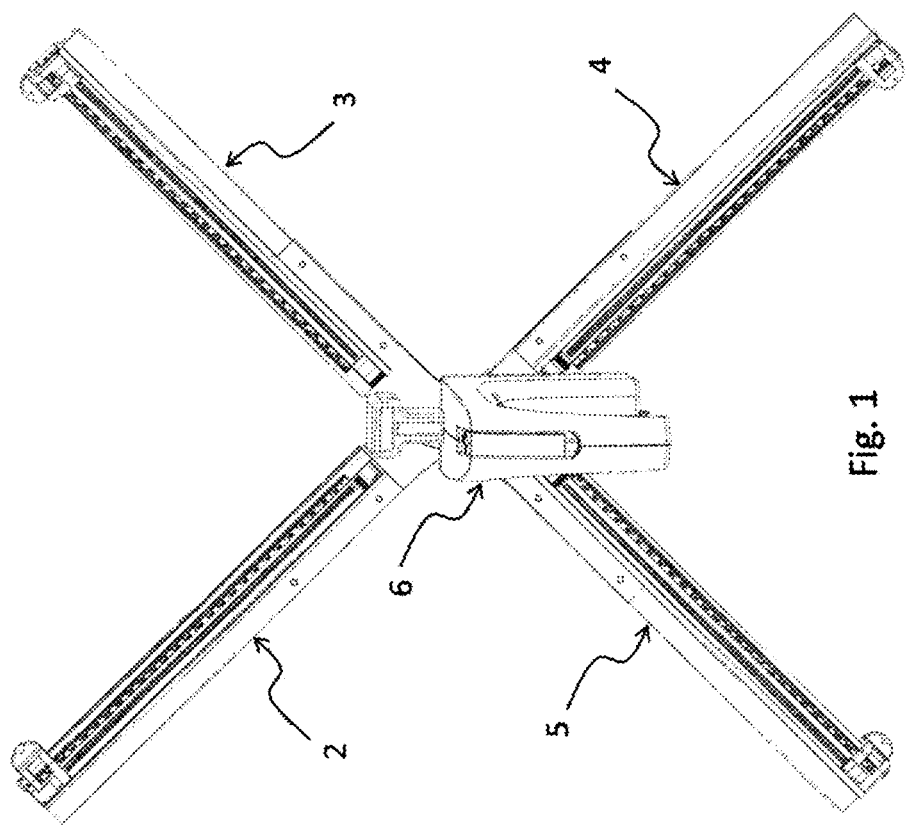
FIG. 1 is a perspective view of an alignment tool according to the invention.
Figure 2:
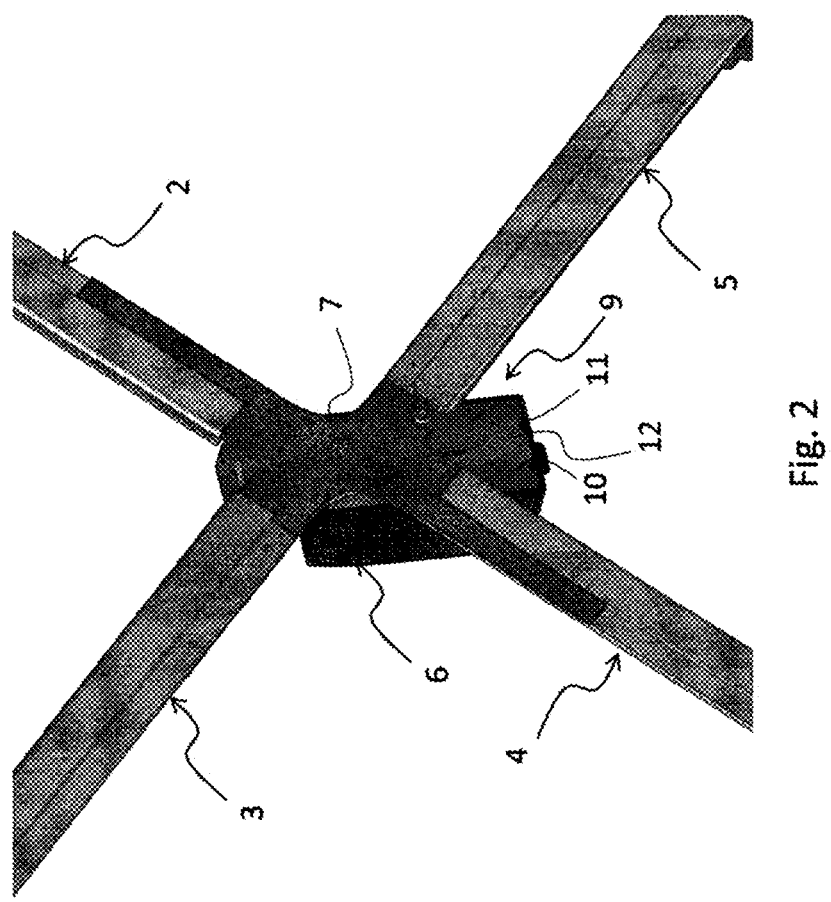
FIG. 2 is partial rear perspective view of the FIG. 1 tool.

Referring to FIGS. 1 and 2, the alignment tool 1 comprises four arms 2-5 connected to a handle 6 which acts as a hub about which the arms can rotate. The first and third arms 2, 4 are attached at their distal ends, as are the second and fourth arms 3, 5, as is more clearly seen in the reverse view of FIG. 2.

The arms 2-5 are therefore arranged as first and second pairs 2, 4 and 3, 5 with a shallow S-bend between the arms, so that the arms of each pair are rigidly linked and generally (but not precisely) diametrically opposed.

In this case, each pairing 2, 4 and 3, 5 is formed of an integral strip of metal material.

Each arm pairing 2, 4 and 3, 5 is rotatably connected to the handle 6 via a bearing 7 which rotates about an inner axle. A mechanical scissor-type linkage 9 is provided such that an angular rotation (α) of one arm pairing 2, 4 in one direction causes the same angular rotation (−α) of the other arm pairing 3, 5 the counter direction.

Figure 3:
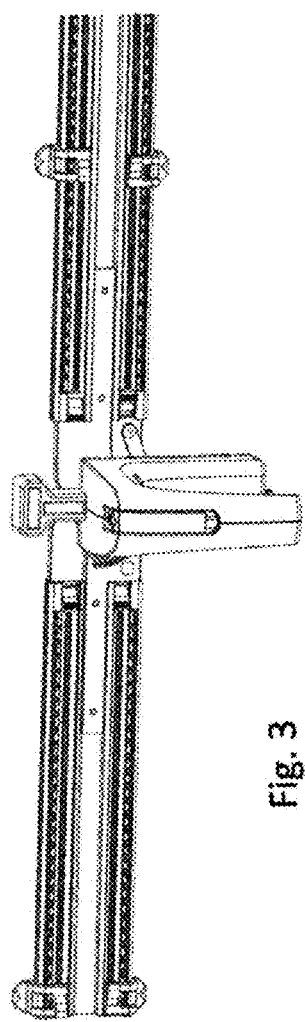
FIG. 3 is a perspective view of the FIG. 1 tool in a storage configuration.

Other than when the arms 2-5 are in a storage position, as shown in FIG. 3, they will assume a symmetrical "X" shaped configuration, examples of which is shown in FIGS. 1 and 2.

Figure 4:
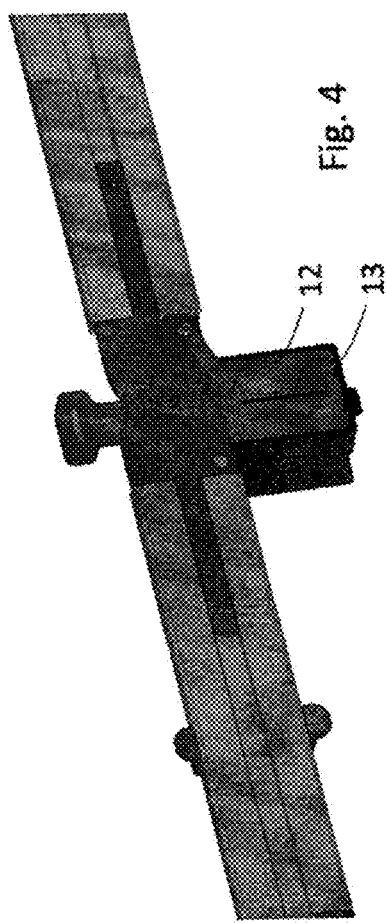
FIG. 4 is a partial rear perspective view of the FIG. 1 tool in the storage configuration.

The first linkage arm 10 is connected at one end via a rotatable joint to part of the third arm 4, and the second linkage arm 11 via a rotatable joint to the fourth arm 5. The other ends of the linkage arms 10, 11 are rotatably connected at a common point to an external part 12 of a sliding component, this external part extending into a vertical slot 13 (see FIG. 4) within the rear of the handle 6 where it is connected to an internal part of the sliding component.

Figure 5:
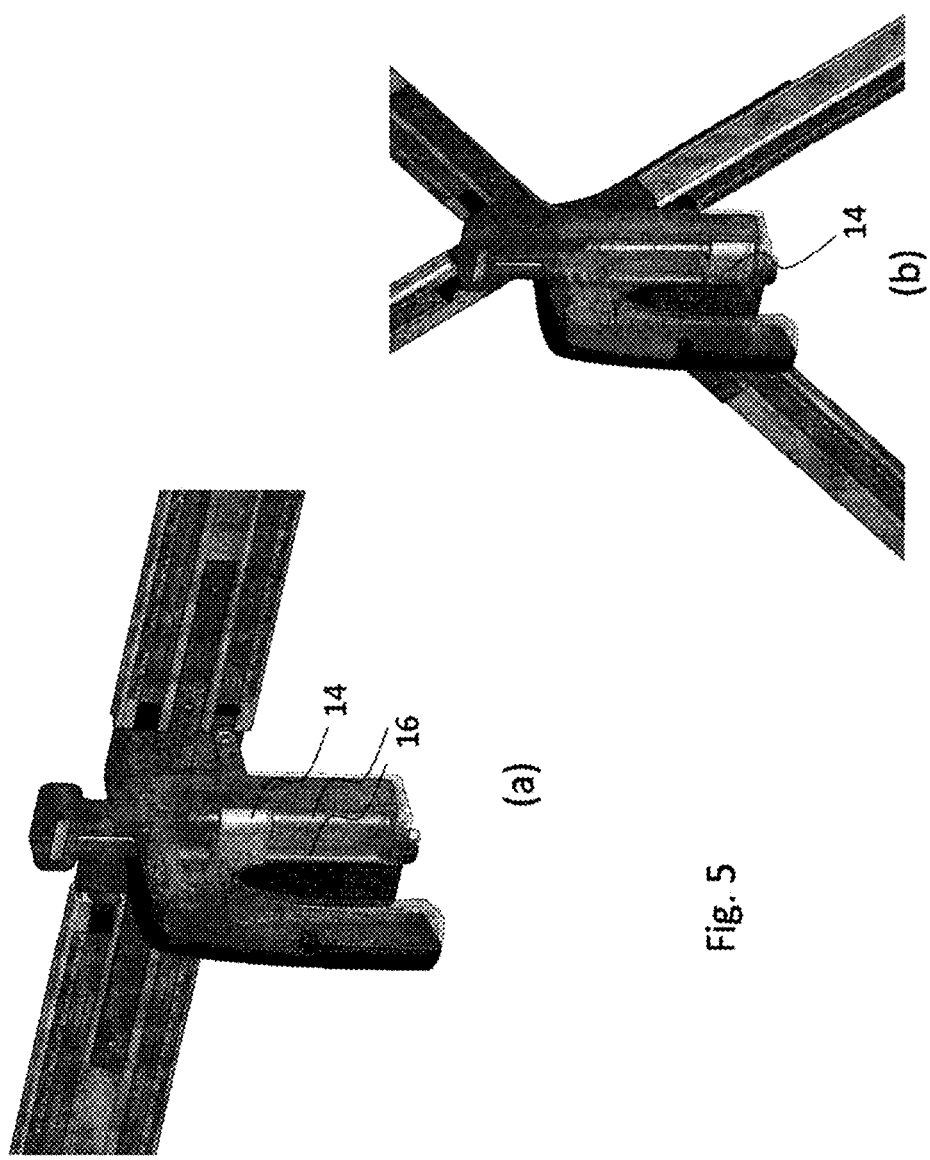
FIGS. 5a and 5b are partial perspective views showing internal components of a handle of the FIG. 1 tool.

Referring to FIGS. 5a and 5b, which show inside the handle 6 for respective different positions of the arms 2-5, the internal sliding component 14 comprises a metallic member having two parallel vertical bores which locate closely around a pair of parallel bars 16; the sliding component is therefore accurately guided along the vertical axis when any one of the arms 2-5 is moved by user force and ensures the arms of the other pairing move by the same angle in the counter direction.

Figure 6:
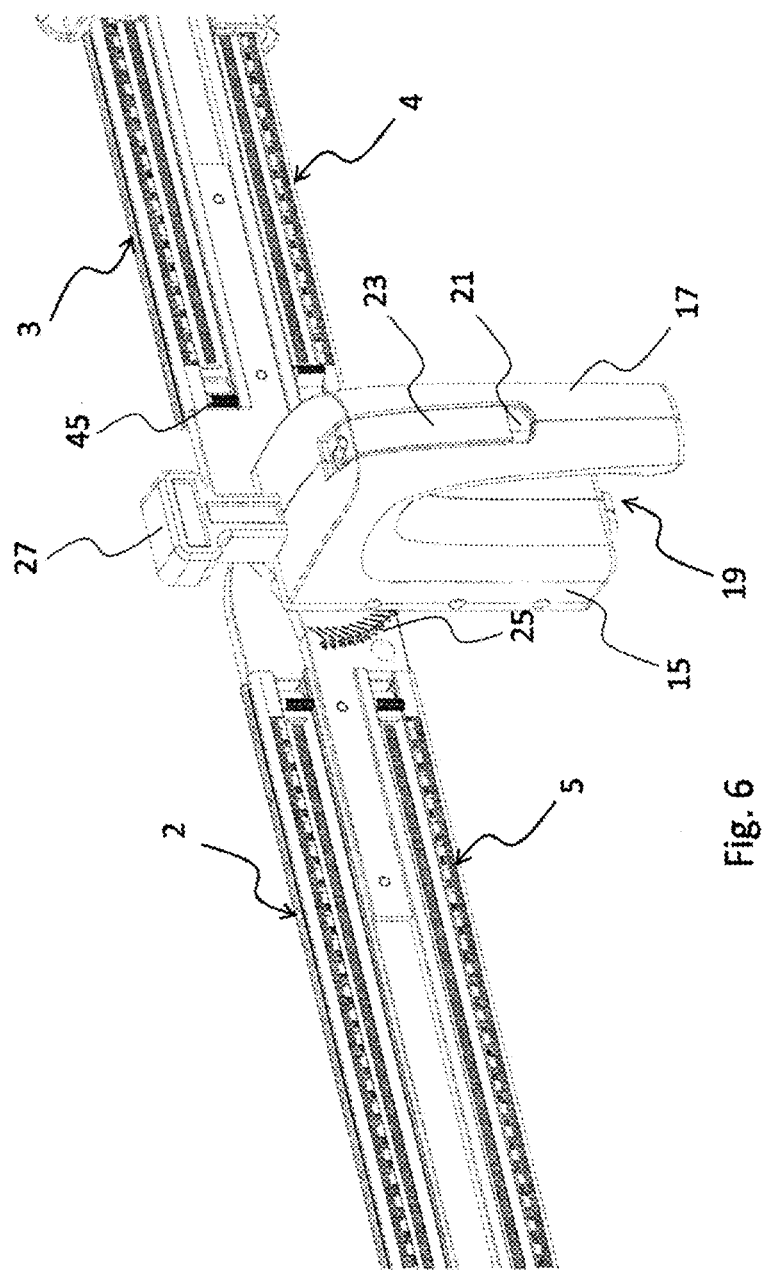
FIG. 6 is a partial perspective view of the handle of the FIG. 1 tool.

Referring to FIG. 6, the handle 6 is generally U-shaped, with a rear part 15 providing a housing for part of a locking mechanism, to be described below, as well as supporting the above-described bearing 7 and linkage 9. Extending forwardly, and then downwardly from the housing 15 is a hand grip 17, shaped and dimensioned to be gripped in one hand, with a channel 19 defined between the housing and grip within which the fingers of one hand can locate in use.

An aperture 21 is formed within the front surface of the grip 17 within which is housed a trigger lever 23 which forms part of the locking mechanism.

In overview, the locking mechanism locks the arms 2-5 against rotational movement until unlocked. Unlocking is effected by pushing the trigger 23 inwards, into the aperture 21, at which point the arms 2-5 are free to rotate. The locking mechanism (and therefore the trigger 23) is biased into the locking position such that the arms 2-5 are locked against rotation unless force is applied to the trigger.

Thus, in use, the user grips the grip 17, presses the trigger 23, and rotates one arm pairing 2, 4 or 3, 5 to the desired angle which effects counter rotation of the other pairing in a symmetrical manner to the same angle. The trigger 23 is then released or pulled back to lock the arms 2-5 at the desired angle.

Figure 7:
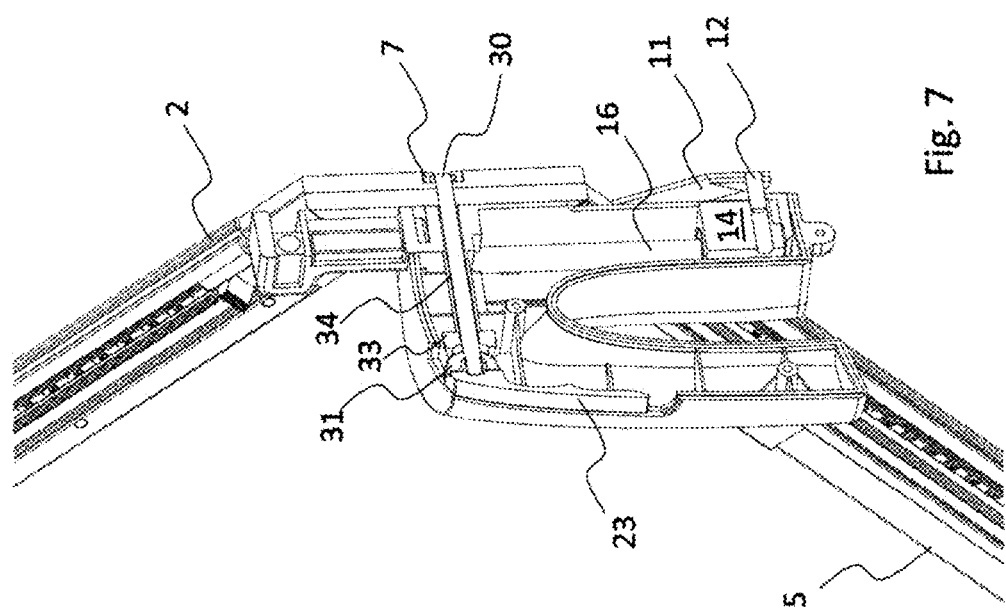
FIG. 7 is a partial cross-sectional view of the handle of the FIG. 1 tool.

Referring to FIG. 7, a cross-sectional view of the tool 1 is shown with a cutting plane that passes through the central, vertical axis, including that of the handle 6. The locking mechanism can be realised using any known type, but here a friction brake is employed to prevent movement of the arms 2-5 when the trigger 23 is in the (shown) locked position. At the upper end of the trigger 23 is a cam portion 31 having a shape that abuts, and applies a rearwards force onto a socket-shaped member 33 which surrounds the central axle 30. Between the socket-shaped member 33 and a rear wall inside the housing 15 is a tube 34 that also surrounds the axle 30 and, in the locked configuration, applies a compressive force to the arms 2-5 between it and the bearing 7 which is fixed in place. In the unlocked configuration (not shown) the cam portion 31 is shaped such as to release the pressure applied by the tube 34 and so the arms 2-5 can rotate.

Referring back to FIG. 6, an angular protractor-like scale 25 is marked on one of the arms 2 with alignment markings arranged such that the shown angle is achieved by moving the arm until the corresponding marking is parallel with the vertical side of the housing 15. Only one scale 25 is needed because all arms 2-5 will assume the required angle when the first arm 2 is moved to the correct angle, but additional scales can be provided on one or more of the other arms 3-5.

A bubble/spirit level 27 is mounted to the handle 6; in this case, two spirit levels (one horizontal and one vertical) are provided as a T-shaped component mounted to the top of the handle on the housing 15. As will be known, the horizontal level provides a visual indication of when the tool 1 is level along the horizontal, whereas the vertical level provides a visual indication of when the tool 1 is plumb. At least a horizontal level should be provided.

Figure 8:
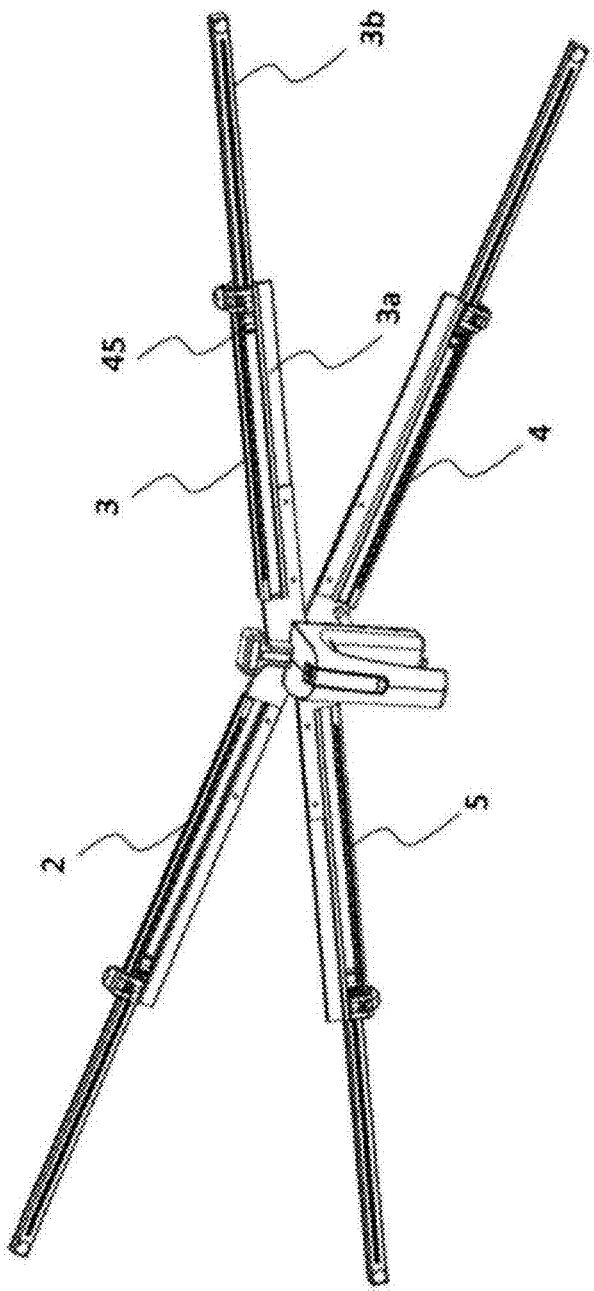
FIG. 8 is a perspective view of the FIG. 1 tool with the arms extended.
Figure 9:
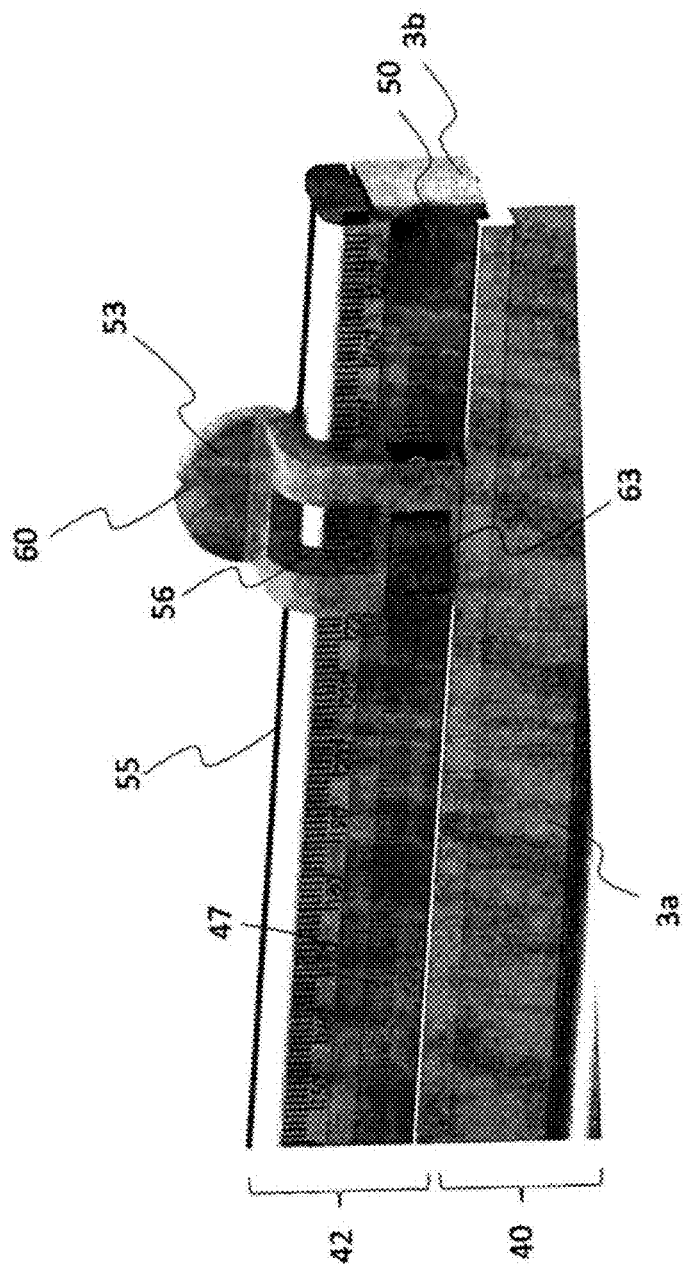
FIG. 9 is a close-up view of one of the arms of the FIG. 1 tool.

Referring to FIGS. 8 and 9, each arm 2-5 is generally planar in form, on the rear surface at least, so that when the tool 1 is offered up to a wall, the arms rest on the wall, substantially flush therewith.

Further, each arm 2-5 is telescopically extendible. Taking the second arm 3 as an example, it comprises (a) a first longitudinal arm section 3a which is the part rotatably connected to the handle 6 and (b) a second, inner arm section 3b that can move relative to the first arm section, axially, to extend overall length.

The first arm section 3a comprises a blade part 40 and a sleeved or slotted section 42 within which the inner arm section 3b locates and slides within, unless locked. The inner arm section 3b is locked in place relative to the sleeved section 42 by means of a cam lock lever 45 provided at the proximal end of inner arm section 3b, and best viewed with reference to FIG. 6.

A marking indicator 50 is provided at the distal end of the inner arm section 3b, in the form of an aperture with a frusto-conical wall, which in use allows and directs a pen, pencil or other marking implement to a precise position for marking a surface. A slider marking indicator may be provided, additionally or alternatively, which may be lockable.

The sleeved/slotted section 42 is open, in the sense that it has a slot running along its length which exposes a toothed strip 47 on the inner arm section 3b. This permits selective movement and locking of a further marking indicator 53 associated with the first section 3a.

This marking indicator 53 comprises a tapered marking notch 60 carried on a slider mounted within a narrow longitudinal slot 55 on the upper edge of the first arm section 3a. The slider has a window 56 which exposes a calibrated lengthwise scale underneath. Beneath the window 56 is a rocker lock switch 63 which enables selective locking of the indicator 53 to the toothed strip 47 of the inner section 3b.

The same configuration of telescopic arm sections applies to the other arms 2, 4, 5, as will be appreciated, and further explanation is not required. FIG. 8 shows how the inner arm sections 3b can be extended.

As indicated in FIG. 9, the scale on each first arm section (e.g. 3a) extends to 280 mm from the central datum point. If this is sufficient, then the inner arm section 3b can remain locked in its non-extended state (as shown in FIG. 1, for example) and the outer indicator 53 moved to set the required marking position on each arm. If a greater length is required, the inner arm section 3b is unlocked and can slide outwards, as in FIG. 8, with the additional offset being indicated using the proximal end of said inner arm section. When the desired offset is achieved, the inner arm section 3b is locked within the outer arm section 3a and the indicator 50 used for marking.

The arrangement of the blade and slotted sections 40, 42 of upper arms 2, 3 may be opposite to that of the lower arms 4, 5. This is so that, when in the storage configuration indicated in FIG. 3, for example, the relatively thin blade parts 40 overlap one another in the manner of scissor blades to keep the tool 1 compact, with the slotted parts 42 adjacent/abutting.

Overall, the tool 1 advantageously allows a user to accurately mark two or four level points on a surface, e.g. prior to drilling. In use, the user manually sets two or four points so that they will be of a required equal distance apart in the upper and/or lower horizontal, with the spirit level used to ensure the tool is level and plumb.

The tool 1 is designed to be compact and easy to use, employing a relatively simple selective locking mechanism which ensures accuracy. The arm lengths can be extended in 1 mm increments, but in the storage condition, e.g. shown in FIG. 3, the tool 1 is of a similar size and shape to a conventional spirit level (approximately 900-1200 mm). It can be made of lightweight material so that it can be used in one hand. Aluminum extrusions and self-lubricating nylon injection moulded plastics parts can be used, e.g. the former for the outer arm sections and the latter for the inner arm sections.

The arms 2-5 are made so as not to flex (at least not significantly) when marking at full length.

The arms 2-5 can open out to a maximum of 90 degrees. The linkage mechanism ensures that movement of just one arm results in a corresponding and accurate movement of the others.

The tool advantageously allows four points, e.g. holes, to be marked on a surface, e.g. aligned vertically and horizontally.

It will be appreciated that the above described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. An alignment device for use in marking a surface, the device comprising:
   a handle comprising a rear part, and a front part shaped to provide a hand grip;
   two pairs of arms, each arm being rotatably connected to the rear part of the handle, the arms of each pair being connected and diametrically opposed either side of the handle, each arm carrying a scale and an indicator element; and
   a user-operable locking mechanism comprising a lever provided on the front part of the handle and selectively movable between a locked position and an unlocked position, the lever in the locked position being arranged to apply a force onto the arms to hinder their rotation and in the unlocked position to release said force to permit rotation.

2. A device according to claim 1, wherein the indicator element is movable relative to its respective arm along at least part of its length.

3. A device according to claim 1, wherein the first and second arms are connected to a mechanism configured such that rotational movement of one arm in a first direction is effective to move the other arm by the same amount in the counter direction.

4. A device according to claim 3, wherein the mechanism is a linkage mechanism comprised of a pair of linkage arms each connected at one part to a respective one of the longitudinal arms and at another part connected to each other.

5. A device according to claim 1, wherein the lever is located within a recess provided on the hand grip part and mounted so as to be substantially flush with the exterior of the hand grip part when locked.

6. A device according to claim 5, wherein the lever is a trigger-type lever provided on or in the front part of the hand grip.

7. A device according to claim 1, further comprising at least one spirit level mounted on the handle.

8. A device according to claim 7, comprising first and second spirit levels, one oriented vertical and the other horizontal.

9. A device according to claim 1, wherein each arm is formed of first and second portions, the first arm portion being connected to the handle and the second arm portion being telescopically mounted with the first arm portion to enable the arm's length to be extended.

10. A device according to claim 9, wherein the first arm portion comprises a slotted sleeve within which the second arm portion is telescopically located.

11. A device according to claim 9, further comprising an extension locking mechanism provided on the second arm portion selectively to prevent and allow telescopic movement between the portions.

12. A device according to claim 9, wherein the indicator element is provided by an aperture formed at or near the free-end of the second arm portion.

13. A device according to claim 9, wherein first and second indicator elements are provided, one on each of the arm portions.

14. A device according to claim 13, wherein the indicator element on the first arm portion is a slider, part of which is located within slot on said arm portion.

15. A device according to claim 14, wherein the slider comprises a slider lock configured to selectively lock the position of the slider relative to the arm.

* * * * *